(12) United States Patent
Babayoff et al.

(10) Patent No.: US 7,202,466 B2
(45) Date of Patent: Apr. 10, 2007

(54) APPARATUS AND METHOD FOR PROVIDING HIGH INTENSITY NON-COHERENT LIGHT AND FOR SPECKLE REDUCTION

(75) Inventors: Noam Babayoff, Rishon le Zion (IL); Yossef Atiya, Maccabim (IL); Tzvi Philipp, Bet Shemesh (IL)

(73) Assignee: Cadent Ltd., Yehuda (IL)

( * ) Notice: Subject to any disclaimer, the term of this patent is extended or adjusted under 35 U.S.C. 154(b) by 145 days.

(21) Appl. No.: 10/924,255

(22) Filed: Aug. 24, 2004

(65) Prior Publication Data

US 2005/0207160 A1    Sep. 22, 2005

Related U.S. Application Data

(60) Provisional application No. 60/497,329, filed on Aug. 25, 2003.

(51) Int. Cl.
  *H01J 3/14* (2006.01)
  *H01J 5/16* (2006.01)
  *H01J 40/14* (2006.01)

(52) U.S. Cl. .................. 250/216; 250/234; 359/629; 359/368

(58) Field of Classification Search ........... 250/234, 250/216, 390.08, 458.1, 459.1; 359/368–378, 359/384, 629, 640; 362/279, 281, 257, 282, 362/287; 378/38–40
See application file for complete search history.

(56) References Cited

U.S. PATENT DOCUMENTS

| | | | |
|---|---|---|---|
| 3,782,804 A | 1/1974 | Kanazawa et al. | |
| 4,155,630 A | 5/1979 | Ih | |
| 4,511,220 A | 4/1985 | Scully | |
| 5,737,084 A | 4/1998 | Ishihara | |
| 6,081,381 A | 6/2000 | Shalapenok et al. | |
| 6,268,893 B1 | 7/2001 | O'Boyle et al. | |
| 6,577,394 B1 | 6/2003 | Zavislan | |
| 6,594,090 B2 * | 7/2003 | Kruschwitz et al. | ........ 359/707 |
| 6,697,164 B1 | 2/2004 | Babayoff et al. | |

FOREIGN PATENT DOCUMENTS

EP    1 292 134 A2    3/2003

OTHER PUBLICATIONS

Shin, S., et al., "Speckle-reduced three-dimensional volumen holographic display by use of integral imaging", *Applied Optics*, vol. 41, No. 14, pp. 2644-2649, (2002).

(Continued)

*Primary Examiner*—Stephone B. Allen
*Assistant Examiner*—Suezu Ellis
(74) *Attorney, Agent, or Firm*—Nath Law Group PLLC; Jerald L. Meyer; Derek Richmond (57) ABSTRACT

An apparatus adapted for confocal imaging of a non-flat specimen comprising a light source for producing a light beam, imaging optics adapted to focus the light beam into at least one spot on a surface of a specimen, and a detector adapted to receive and detect light reflected from the specimen surface. The light source comprises an optical system for converting a coherent beam into a plurality of beams, each of which is modified by a moving diffuser within a range of movement that is correlated to the detector's integration time.

41 Claims, 4 Drawing Sheets

OTHER PUBLICATIONS

Andersen, G., et al., "A high resolution, holographically corrected microscope with a Fresnel lens objective at large working distances", *Optics Express*, vol. 2, No. 13, pp. 546-551, (1998).

Kip, D., et al., "Transmission of images through highly nonlinear media by gradient-index lenses formed by incoherent solitons", *Optics Letters*, vol. 26, No. 8, pp. 524-526, (2001).

* cited by examiner

APPARATUS AND METHOD FOR PROVIDING HIGH INTENSITY NON-COHERENT LIGHT AND FOR SPECKLE REDUCTION

This application claims the benefit of prior U.S. provisional patent application No. 60/497,329 filed Aug. 25, 2003, the contents of which are hereby incorporated by reference in their entirety.

FIELD OF THE INVENTION

This invention relates to the reduction of speckle noise in optical systems comprising imaging optics, in which a coherent light source is used, and to the generation of low coherence high intensity light from coherent light sources for use in optical systems.

BACKGROUND OF THE INVENTION

A common difficulty associated with the use of coherent light sources such as lasers in imaging optical systems is a phenomenon known as speckle. Speckle arises when coherent light scattered from a rough surface is detected by an intensity detector that has a finite aperture, such as an observer's eye or a detector. The image on the screen appears to be quantized into little areas with sizes equal to the detector resolution spot. The detected spot intensity varies randomly from darkest, if contributions of the scattering points inside the spot interfere destructively, to brightest if they interfere constructively. This spot-to-spot intensity fluctuation is referred to as speckle. The resultant speckled light signal on the detector appears as spatial and temporal noise in whatever sensor is used in the imaging system.

Speckle reduction is known to involve averaging a number of independent speckle configurations, i.e. obtained from different un-correlated and non-interfering reflecting beams. Since speckle depends on essentially three light parameters: angle, polarization, and wavelength of the illuminating laser beam, independent speckle configurations can be generated through the diversification of any of these three light parameters. To solve the problem of speckle, many attempts have been made, mostly based on angle diversification, obtained by means of diffusers and/or movable optical elements, or by means of polarization diversification.

In U.S. Pat. No. 4,155,630 to Ih, there is disclosed a process and apparatus for improving image creation in a coherent light imaging system which involves directing a diffused light onto a mirror having a rocking motion whereby angle diversification is obtained. The rocking motion causes the reflected rays to sweep a two-dimensional area and focus the reflected light through a diffuser before collimating the rays for use in image creation. Applying a combination of voltages to three independent piezo-electric crystals upon which the mirror is mounted produces the rocking motion of the mirror.

U.S. Pat. No. 6,081,381 to Shalapenok, et al., describes a method and apparatus for eliminating speckle in an optical system by angle diversification obtained by the use of a diffuser and by a rotating micro-lens array having a rotational speed related to the laser parameters. The micro-lens illumination comes off of a stationary diffuser and eventually provides a large area that is uniform and speckle free illumination.

U.S. Pat. No. 4,511,220 to Scully, discloses a laser target speckle eliminator for laser light reflected from a distant target whose roughness exceeds the wavelength of the laser light. The apparatus includes a half-plate wave member, a first polarizing beam splitter member, a totally reflecting right angle prism, and a second polarizing beam splitter member, all of which are in serial optical alignment. Used in combination, the components convert a linearly (i.e., vertically) polarized laser light beam having a known coherence length, into two coincident, orthogonally polarized beams that are not coherent with each other. The resultant beams have an optical path difference exceeding the known coherence length of the laser, thereby eliminating the speckle in that system.

In U.S. Pat. No. 6,577,394 to Zavislan, there is disclosed a scanning laser confocal microscopy system for reducing speckle from scatterers that exist outside (above and below) the section which is being imaged by utilizing orthogonally polarized sheared beams. The sheared beams are focused to spots that are laterally or vertically offset. The polarized beams have opposite senses of circular polarization.

SUMMARY OF THE INVENTION

In accordance with the present invention there is provided a method and apparatus for speckle reduction in an imaging system using coherent light, particularly useful for determining the surface profile of a non-flat object/specimen by confocal imaging. To perform such imaging, the apparatus typically comprises a confocal aperture and means for focusing an incident beam at a plurality of axial locations. In such imaging, also known as confocal microscopy, speckle is particularly problematic because the confocal imaging process requires focusing laser light on the specimen surface when the most speckle occurs.

Thus, the present invention is directed to an apparatus adapted for confocal imaging of a non-flat specimen, said apparatus having an optical axis and a predetermined lateral resolution and comprising a light source for producing a light beam, imaging optics adapted to focus the light beam into at least one spot on a surface of a specimen, and a detector having an integration time and adapted to receive and detect light reflected from said surface; said light source comprising:

a parent coherent light source for providing a parent beam of coherent light;

a beam splitter for splitting said parent beam into an array of incident beams, each beam being focused at a spot; and a moving diffuser arrangement located at or near said spots, and adapted for presenting a different diffuser part to each focused spot as the diffuser arrangement is moved in a path between at least two positions.

Preferably, the apparatus further comprises a collimator arrangement for collimating the light from said coherent light source. The beam splitter may comprise a fixed grating or fixed micro-lens array comprising a plurality of micro-lens elements adapted for focusing collimated light from said collimator arrangement to a plurality of said spots. Such micro-lens elements are typically plano-convex lens elements, including any one of spherical or aspherical plano-convex lends elements, for focusing the spots downstream of the lens elements. The apparatus may further comprise a relay lens for refocusing the said spots to refocused spots, wherein said moving diffuser arrangement is located at or near the said refocused spots. The length of said path of said diffuser arrangement and at least one diffuser characteristic thereof presented to each said spot is such as to provide a plurality of differently modified wavefronts from each spot, which provide a corresponding plurality of different speckle configurations at an object illuminated by said source. The diffuser arrangement movement typically has a predetermined speed such that said plurality of different speckle configurations may be obtained within a predetermined time period. This time period may be correlated to an integration time period of said detector. Typically, said movement of said diffuser arrangement is synchronized to said integration time of said detector such that the averaging of independent said speckle configurations may be performed over one full period of diffuser movement, or a portion of it.

The diffuser arrangement may comprise, for example, any one of:

(a) a rotating diffuser element having a rotational axis offset with respect to an optical axis of said system, such that the complete path experienced by each said spot during any integral number of complete revolutions of said diffuser arrangement is such as to present a sufficiently varied diffuser pattern so as to provide a corresponding plurality of different speckle configurations to said detector;

(b) a rotating diffuser element having a rotational axis offset with respect to an optical axis of said system, said diffuser element comprising a plurality of equal-angled segments about the rotational axis each having identical diffuser features one to the other, such that the complete path experienced by each said spot during any integral number of complete segments of said diffuser arrangement is such as to present a sufficiently varied diffuser pattern so as to provide a corresponding plurality of different speckle configurations to said detector;

(c) a rotating diffuser element adapted for eccentrically rotating within an orbit element, the center of the orbit being aligned with respect to an optical axis of said system, such that the complete path experienced by each said spot during any integral number of complete revolutions of said diffuser arrangement in the orbit is such as to present a sufficiently varied diffuser pattern so as to provide a corresponding plurality of different speckle configurations to said detector;

(d) an oscillating diffuser element, such that the complete path experienced by each said spot during any integral number of full-amplitude translations of said diffuser arrangement is such as to present a sufficiently varied diffuser pattern so as to provide a corresponding plurality of different speckle configurations to said detector.

The apparatus typically further comprises a second beam-splitter for directing reflected light from an object to said detector.

In a corresponding method for confocal imaging of a non-flat specimen, the method comprises:

providing an apparatus comprising a coherent source of light and a detector;

splitting a parent beam from a coherent light source into an array of incident beams, each beam being focused at a spot;

moving a diffuser arrangement at the origin of said plurality of secondary light beams, and presenting a different diffuser part to each said secondary beam as the diffuser arrangement is moved between at least two positions;

focusing the incident beams into at least one spot on a surface of the specimen by means of imaging optics;

directing light reflected by the surface toward the detector; detecting the light by the detector;

wherein said diffuser arrangement is moved between said positions within the integration time of the detector.

The method may further comprise the step of collimating the light from a said coherent light source. The parent beam may be split by means of a fixed grating or fixed micro-lens array comprising a plurality of micro-lens elements adapted for focusing collimated light to a plurality of said spots. The method may further comprise refocusing the said spots, and moving said diffuser arrangement between at least two positions at or near the said refocused spots. The length of the path of movement of said diffuser arrangement and at least one diffuser characteristic thereof presented to each said spot is such as to provide a plurality of differently modified wavefronts from each spot, which provide a corresponding plurality of different speckle configurations at an object illuminated by said incident beams. The movement of said diffuser arrangement is typically synchronized to said integration time of said detector such that the averaging of independent said speckle configurations may be performed over one full period of diffuser movement, or a portion of it. According to the method, the diffuser arrangement may comprise, for example, any arrangement as described for the apparatus of then invention.

The present invention is also directed to an optical system for converting a substantially coherent parent light source into a plurality of light sources having at least reduced spatial coherence of illumination compared to said coherent parent light source, such a system being useful with the aforementioned apparatus, for example. The system is such that individual light sources of said plurality of light sources each comprise an intensity that is not far below the intensity of the parent light beam. Typically, the relative intensity of the plurality of light beams with respect to the parent light source may be S %, wherein S may be in the range between the range about 70% to about 90%, and more preferably in the range of about 85% to about 99%. The system comprises:

a beam splitter for splitting a parent beam from a said coherent parent light source into an array of incident beams, each beam being focused at a spot; and a moving diffuser arrangement located at or near said spots, and adapted for presenting a different diffuser part to each focused spot as the diffuser arrangement is moved in a path between at least two positions.

Typically, the system further comprises a collimator arrangement for collimating the light from a said coherent light source. The beam splitter may comprise a fixed grating or fixed micro-lens array comprising a plurality of micro-lens elements adapted for focusing collimated light from said collimator arrangement to a plurality of said spots. The said micro-lens elements may be plano-convex lens elements, including any one of spherical or aspherical plano-convex lends elements. Typically, the system further comprises a relay lens for refocusing the said spots to refocused spots, wherein said moving diffuser arrangement is located at or near the said refocused spots. The length of said path of said diffuser arrangement and at least one diffuser characteristic thereof presented to each said spot are such as to provide a plurality of differently modified wavefronts from each spot, which provide a corresponding plurality of different speckle configurations at an object illuminated via said system.

The diffuser arrangement may comprise, for example, any one of the configurations described for the apparatus of the invention, wherein in each case the corresponding plurality of different speckle configurations may be provided at an object illuminated via said system.

The diffuser arrangement movement typically has a predetermined speed such that said plurality of different speckle configurations may be obtained within a predetermined time period, which may be correlated to an integration time period of a detector that may be used in conjunction with said system for detecting light reflected from an object illuminated via said system.

In a corresponding method for converting a coherent light source into a plurality of light sources having reduced spatial coherence of illumination compared to said coherent light source, the method comprises:— splitting a parent beam from a coherent light source into an array of incident beams, each beam being focused at a spot; and moving a diffuser arrangement that is located at or near said spots, and presenting a different diffuser part to each focused spot as the diffuser arrangement is moved in a path between at least two positions.

The method further comprises the step of collimating the light from a said coherent light source. The parent beam may be split by means of a fixed grating or fixed micro-lens array comprising a plurality of micro-lens elements adapted for focusing collimated light to a plurality of said spots. The method may optionally comprise refocusing the said spots, and moving said diffuser arrangement between at least two positions at or near the said refocused spots. The length of the path of movement of said diffuser arrangement and at least one diffuser characteristic thereof presented to each said spot is such as to provide a plurality of differently modified wavefronts from each spot, which provide a corresponding plurality of different speckle configurations at an object illuminated by said incident beams. The diffuser arrangement may comprise, for example, any of the configurations described for the optical system. The diffuser arrangement may be moved at a predetermined speed such that said plurality of different speckle configurations may be obtained within a predetermined time period, which may be correlated to an integration time period of a detector that may be used in for detecting light reflected from an object illuminated by a plurality of light sources generated according to the method.

The present invention also relates to a multiple light source for providing a plurality of light beams, comprising:

a parent coherent light source for providing a parent beam of coherent light; and an optical system according to the invention.

The present invention finds particular application in the three-dimensional imaging of dental surfaces, particularly teeth and parts thereof and/or of dental prostheses, though the invention is not limited to such applications and may be used for any other application in which speckle reduction is desired or required. Optionally, surface topological data of a patient's dental cavity using the apparatus and corresponding method of the invention may be obtained at a first location, such as at a dental practitioner's office. This data may be optionally transmitted to one or more other locations remote from the first location, such as for example a dental lab or a dental service center, for any suitable purpose, such as for example for designing and/or manufacturing a dental prosthesis, or for designing a dental treatment plan such as for an orthodontic treatment.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF THE INVENTION

Figure 1:
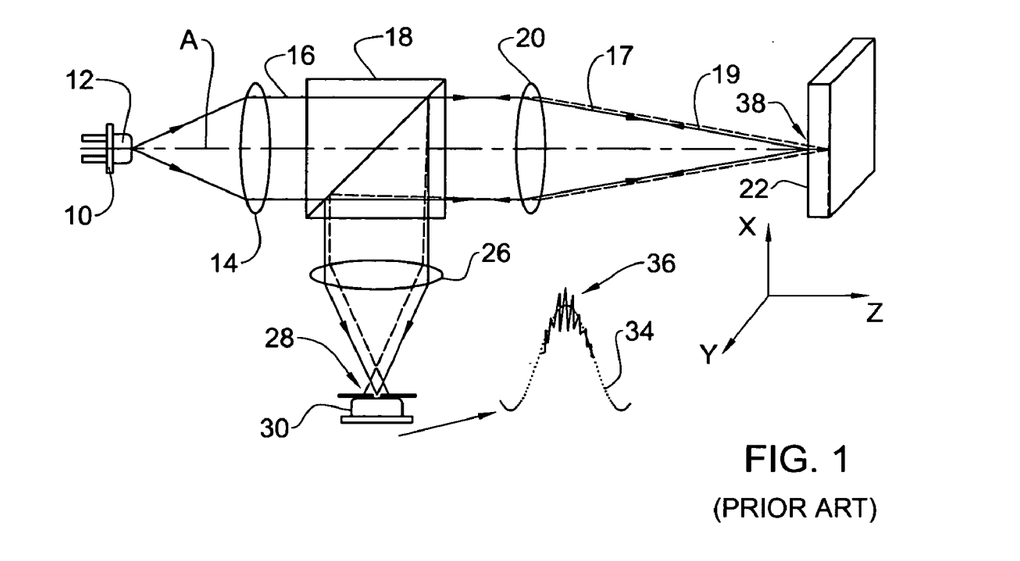
FIG. 1 is schematic view of a confocal scanning system as known in the art.

FIG. 1 shows a typical prior art apparatus for determining a 3-D profile, or topography, of the surface of an object/specimen, e.g. a tooth, at a desired lateral and axial resolution. The apparatus is a confocal imaging system comprising a laser 10, which constitutes a source of coherent light 12; a collimating lens 14 disposed in front of the laser for collimating the emitted light into a beam 16; a beam splitter 18 through which the collimated beam 16 passes; an optical imaging component in the form of an objective lens 20 for focusing the light beam into a beam 17 (hereinafter 'incident light beam'), on a non-flat specimen 22 whose topography is to be determined. The above components are disposed along an optical axis A. The specimen 22 is shown in a perspective view to emphasize that it contains a depth (in Z-direction coinciding with the optical axis A) as well as a length and a width (in an X-Y plane perpendicular to the optical axis A). The incident light beam 17 that illuminates specimen 22 and forms thereon a spot 38, is reflected back through lens 20 producing a reflected beam 19 which passes through the lens 20 toward the beam splitter 18. The apparatus further comprises an image detector 30 having an integration time, and a focusing lens 26 and a confocal aperture or pinhole 28 disposed between this detector and the beam splitter so that the beam 19 is reflected by the beam splitter 18 towards the detector 30 passes through the focusing lens 26 and the pin-hole 28.

When the specimen 22 is scanned axially (Z-axis), either by axial displacement of the specimen or by axial displacement of the objective lens 20, it will take positions at which the incident light beam 17 will or will not be focused on its surface. In the latter case, the reflected light 19 will be partially blocked by the pinhole 28 thus producing a low intensity signal at the detector 30. As the specimen 22 gets closer to an in-focus position, the amount of light passing through the pinhole 28 increases, yielding a maximum signal from the detector 30 at the best focus.

The intensity of the signal is thus related to the depth (i.e. along the Z-axis) of a scanned point. By imaging at a number of depths (Z-coordinates) an intensity profile can be obtained, which is known as an Optical Section Profile (OSP) 34. The peak of the OSP 34 yields the relative depth, or position, of the surface point on the specimen being scanned. Repeating the depth scanning process for every X and Y location on the specimen surface yields a full 3-D profile, or topography, of the specimen.

The phenomenon of speckle in the reflected light results in a noisy OSP 34, seen as wavy lines 36 in FIG. 1, impairing the accuracy of the depth coordinate determination. The more in focus the scanning spot 38 is on the specimen 22, the stronger the speckle contrast becomes, hence the noise recorded by the detector 30 is more significant at the peak of the OSP 34 where it is most unwanted.

Figure 2:
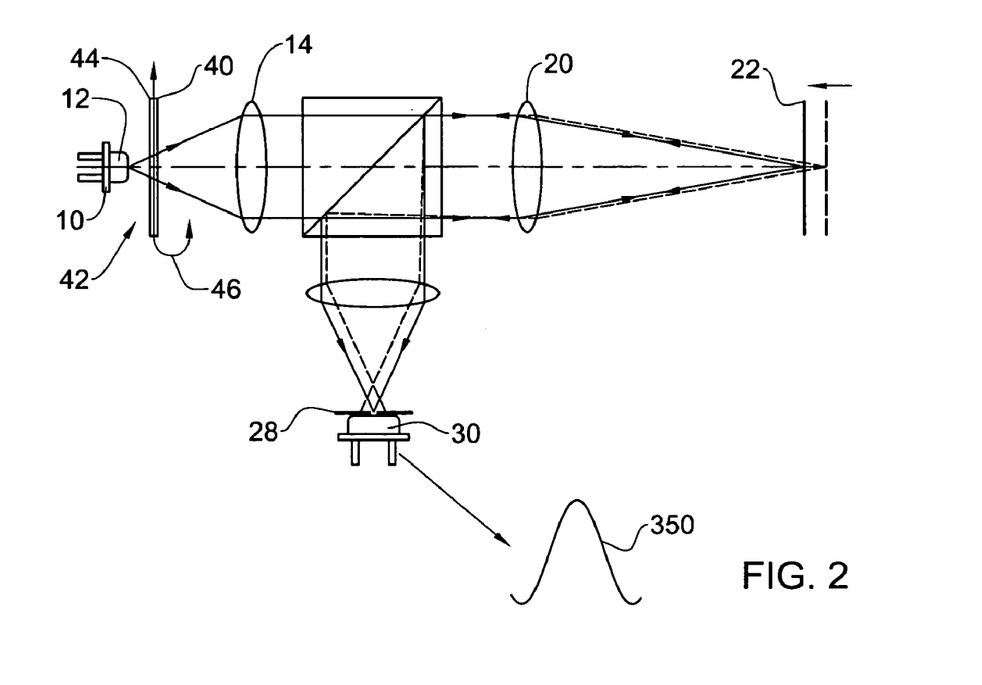
FIG. 2 is schematic view of a confocal scanning apparatus having a diffuser arrangement.

FIG. 2 illustrates an apparatus, similar to that shown in FIG. 1, and further comprising a light diffuser 40 at or near the focal plane of the laser 10. The diffuser 40 has a movement/vibration mechanism 42 for producing a periodic movement of the diffuser, as indicated by arrows 44 and 46.

The diffuser 40 is placed at a point where the laser spot is small—near the focal point but not on the focal point. The diffuser 40 has scatter characteristics matching the desired source numerical aperture, and is vibrated with a frequency and amplitude such that the speckles vary over their full contrast range. While the diffuser 40 is vibrating, the objective lens 20 may be moved in a manner that is synchronized to the capture period of the detector 30 such that the speckle averaging is performed over one full period of the lens movement—or a portion thereof.

An integrated average signal is collected through the exposure time and recorded. The above is repeated for each depth position (axial movement of the objective lens 20 or specimen 22) to produce a relatively smooth OSP 350.

Figure 3:
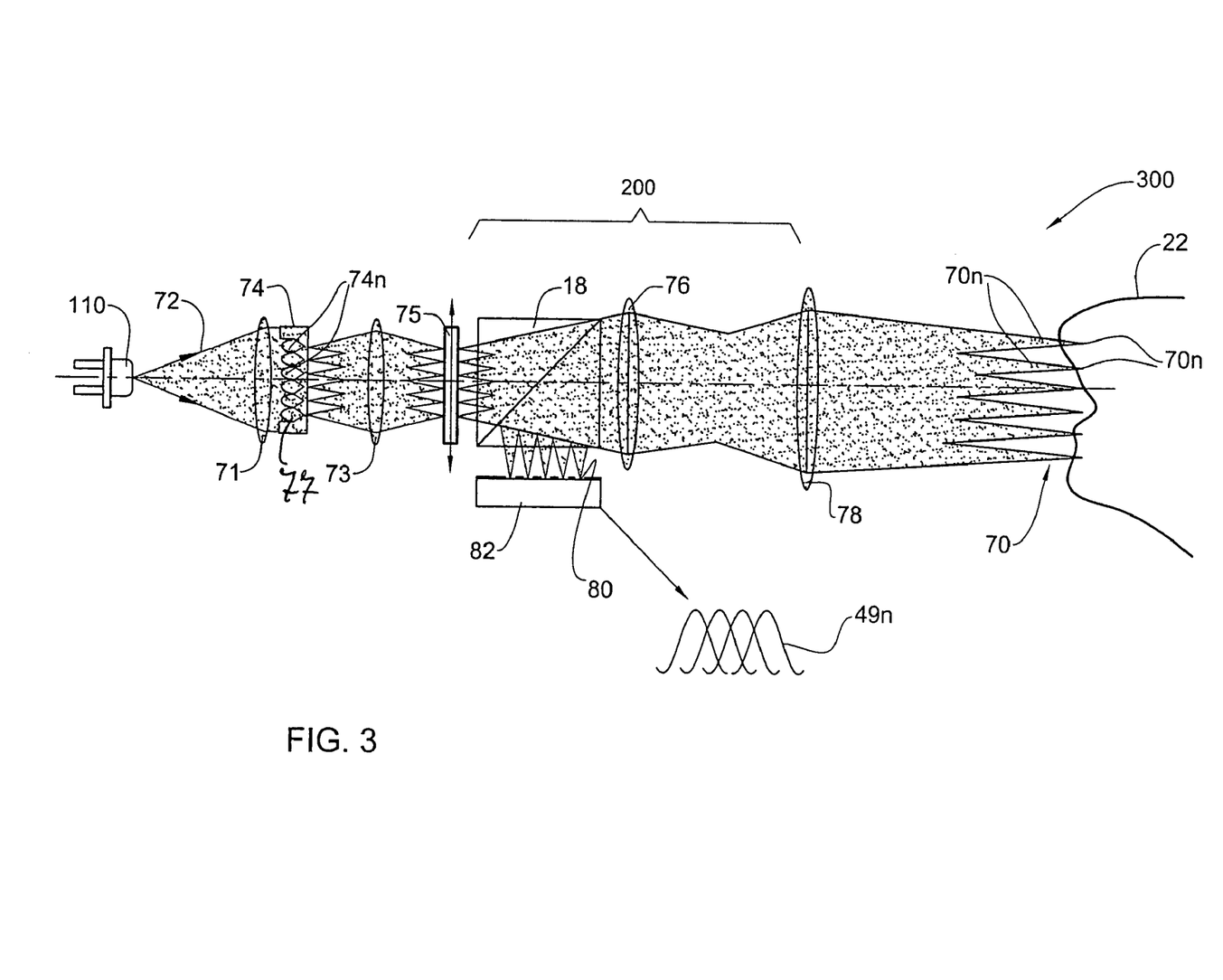
FIG. 3 is schematic view of a parallel confocal scanning apparatus according to an embodiment of the present invention.
Figure 4:
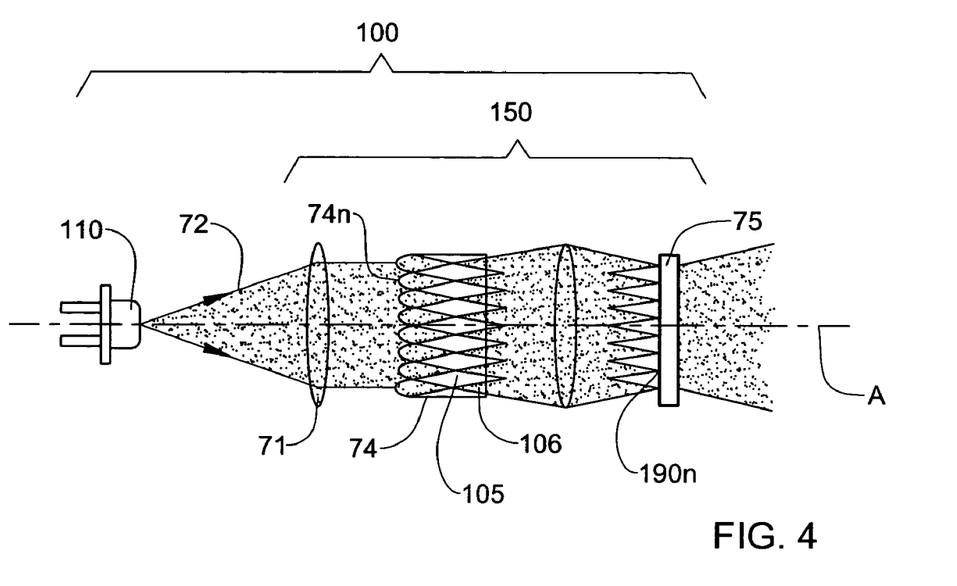
FIG. 4 is schematic view of a multiple light source and optical system for providing multiple light sources according to an embodiment of the present invention.

FIGS. 3 and 4 illustrate an embodiment of the present invention comprising a multi-spot parallel confocal system, generally designated with the numeral 300, based on the kind disclosed in U.S. Pat. No. 6,697,164 assigned to the present Assignee (WO 00/08415). In this system 300, a grid or spot array 70 illuminates the specimen 22 (shown as a tooth) and each spot $70n$ of the array axially scans the specimen to produce a relatively smooth OSP $49n$. In other words, each illuminating spot $70n$ in the array 70 undergoes a depth scan. The spot array 70 is directed onto the specimen 22, via focusing optics 200, which comprises beam splitter 18 and magnifying optics including a source objective lens 76 and a specimen objective lens 78. The reflected light is directed, via the same lenses 76 and 78 and the beam splitter 18, toward a detector 82 having an array of n detector elements and having n pinholes 80 corresponding to micro-lenses $74n$ of the micro-lens array 74. Alternatively, the micro-lens array can be comprised of a fixed grating 77. The detector 82 is aligned with the focusing optics 200 such that the individual detector elements are aligned with corresponding individual reflected light beams originating from the plurality of light sources provided by the source 100.

When a relatively non-coherent light, which may be generated using light source 100 of the present invention, is used, a relatively smooth OSP $49n$ is generated from each detector element of the detector array 82, and thus the Z-coordinate is determined from each spot $70n$.

As seen in FIG. 4 multiple light source 100 is adapted for use as part of system 300, and provides a plurality of high intensity light sources $190n$ from a coherent light source 110 by means of optical system 150, such that the coherence of the plurality of light sources $190n$ is significantly reduced with respect to the coherence of the coherent light source 110. At the same time, the intensity of at least a majority of the individual light sources $190n$ of the plurality of light sources is maintained within predetermined limits, such as for example S % of the intensity of the original light source 110. Further, the light provided by each said individual light source $190n$ is substantially uniform. The value of S is preferably in the range of about 70% to about 90%, and more preferably in the range of about 85% to about 99%.

Without being bound by theory, it is believed that the overall scattering or diffusion angle achieved by placing a diffuser close to the laser source (herein referred to as the "datum light source system"), as is generally the case in prior art optical systems that incorporate a diffuser, is much higher than the sum of the individual scatterings achieved when placing the diffuser at or near the origin of the plurality of light sources provided by the micro-lens array and which uses the same coherent light source as the datum light source system. Accordingly, it is believed that for a given light source/object set up, the relatively lower overall scattering provided by the light source of the present invention results in the intensity thereof being maintained to a greater degree for any given distance from the parent light source, than in the aforesaid equivalent datum light source system. The diffuser 75 creates a divergence of the beams originating from the sources $190n$, and introduces random phase heterogenuieties into the individual wavefronts, thereby decreasing their coherence.

Thus, source 100 generates a single coherent incident beam, typically a laser beam 72 from coherent parent light source 110, and the beam 72 is collimated via laser collimator 71 and passes into a micro-lens array 74 comprising a plurality of micro-lenses $74n$, comprised in said system 150. The array 74 generates a plurality of incident beams that are focused as spots at the focal points 105 of the micro-lenses 74, one spot per micro-lens, correspondingly producing the desired spot array 70 via focusing optics 200. Thus, the spots at the focal points 105 act as individual light sources. The micro-lens array 74 is spatially fixed at least in directions orthogonal to the optical axis A, and the micro-lenses $74n$ are configured to each provide an individual light source in the form of a converging beam in the downstream direction away from the source 110. Thus, the micro-lenses $74n$ are typically plano-convex, having a common planar face for all the micro-lenses facing the downstream direction, and individual upstream faces, which may be spherical or aspherical having any desired curvature, for each micro-lens $74n$. In practice, the physical dimensions of the micro-lens array 74, particularly its thickness in the direction of the optical axis A, is such that the focal plane comprising focal points 105 of the micro-lens array 74 is within the micro-lens substrate 106, i.e., upstream of the planar face of the array 74. A relay lens 73 refocuses the beams onto a moving light diffuser 75, as will be described in more detail hereinbelow, and these focused points on the diffuser 75 act as said light sources $190n$, such that the light beams emerging from these points of the diffuser 75 have reduced coherence, while substantially maintaining the intensity within the aforementioned predefined limits.

Alternatively, the micro-lens array may have a flat upstream face, and a plurality of concavities at the downstream face for focusing the spots. Many other arrangements are of course possible including a combination of different individual micro-lens configurations in the micro-lens array. In other embodiments, the micro-lens array may be replaced with a suitable grating.

In this embodiment the relay lens 73 has a unity magnification and brings the micro-lens focal point 105 out of the microlens substrate 106 so that the diffuser can act on the spots provided by the micro-lens array 74. In embodiments in which the thickness of the micro-lens array 74 is such that the spots focused by the micro-lens array 74 is in the body of micro-lens array 74, it is necessary to provide the relay lens 73, or an equivalent optical arrangement, for enabling disruption of the light coherence to reduce speckle when illuminating a non-smooth object with source 100. Optionally, the relay lens 73 may provide a magnification greater than or less than unity. Another condition that needs to be met is that a minimum diffuser cell (which is the "resolution" of the diffuser or diffusing or scattering angle of the diffuser—the fundamental characteristic part of the diffuser that carries similar phase characteristics) must be contained within a single confocal spot. To this end, typically a particularly fine light diffuser is required.

In other embodiments where the focal plane of the focal points 105 is physically downstream of the micro-lens array 74, the relay lens 73 can be dispensed with, and the moving diffuser 75 located at the plane of focal points 105, wherein the points now focused on the diffuser act as said light sources 190n, such that the light beams emerging from these points of the diffuser 75 have reduced coherence, while substantially maintaining the intensity within predefined limits.

In the parallel confocal spot array system 300, each individual light source 190n provided by multiple light source 100 is individually treated with a corresponding diffuser element provided by diffuser 75 such that a suitable coherence reduction is achieved for each source 190n, resulting in the elimination or reduction of speckle when a non-smooth surface is illuminated by the sources 190n.

The focusing optics 200 comprises a unity magnification factor between the source and the detector, as the same optical elements are used to project and to detect the light.

Putting the above in simpler words, there are two contradicting tendencies. On the one hand there is a need to provide diffuser features which are sufficient such that the detector contains a few of them, and on the other hand, such a situation results in overfilling the collimator aperture since the fine diffuser features scatter light more strongly. This will give rise to intensity inefficiency.

In the present invention, rather than attempting to reduce coherence of the light beam 72 directly by means of a diffuser immediately downstream thereof, each light source 190n is individually treated by means of a moving diffuser so as to reduce the coherence of each of the light beams provided by these sources 190.

The movement of the diffuser 75 with respect to each light source 190n is such that the light from each individual source 190n passes through the same combination of diffuser elements per each integration interval of the detector 82.

The length of the path of the diffuser 75, and diffuser characteristics, e.g. pattern intensity, presented to each individual light source 190n, is such as to provide as great a number as possible of differently modified wavefronts from each source 190n, which provide a corresponding plurality of different speckle configurations at the object 22, for maximum statistical sampling. However, the divergence of the beams is still smaller than the lateral resolution of the detection apparatus 82. The diffuser movement is synchronized to the integration time of the detector 82 such that the averaging of the independent speckle configurations may be performed over one full period of diffuser movement, or a portion of it.

The detector 82 averages out these independent speckle configurations, thereby yielding a relatively smooth OSP 49n for each source 190n, as shown in FIG. 3. The averaged signals collected during the integration time may be recorded automatically by known means and will not be discussed further.

A number of exemplary arrangements for moving diffuser 75 will now be described.

Figure 5:
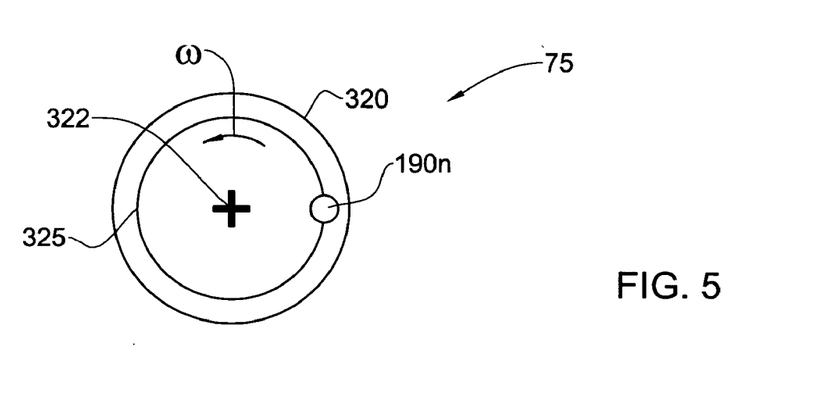
FIG. 5. is front view of a rotating light diffuser usable with the embodiment of FIG. 3 or FIG. 4.

Referring to FIG. 5, diffuser 75 comprises a circular diffuser disc 320, having its center of rotation 322 parallel but offset from the optical axis A. As the diffuser is rotated in direction ω, each focused spot that will become a light source 190n after the light originating therefrom passes through the diffuser 75, circumnavigates a circular path 325 at or adjacent the periphery of the diffuser. In this case, the diffuser rotates an integral number of times (typically one time) within the detector integration time, thus averaging out the intensity modulation. The complete path 325 experienced by the individual light source 190n during a complete revolution of the diffuser is such as to present a sufficiently varied diffuser pattern such as to provide a sufficiently high number of differently modified light beams which can average out to cancel the speckle effects.

Figure 6:
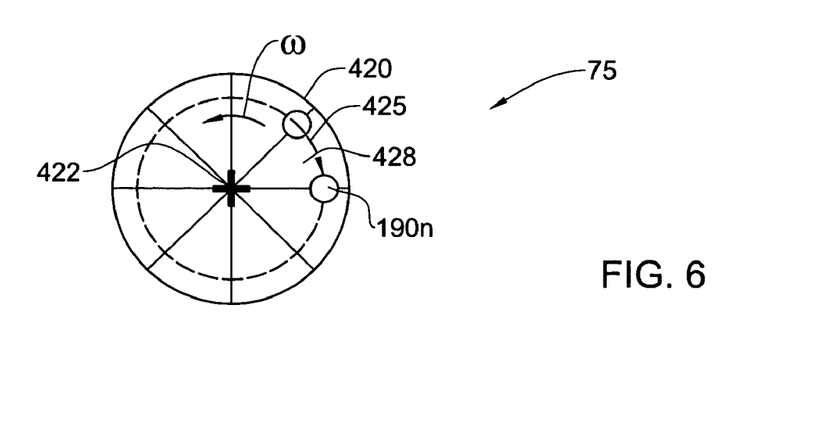
FIG. 6 is front view of a segmented rotating light diffuser usable with the embodiment of FIG. 3 or FIG. 4.

Referring to FIG. 6, a similar arrangement to that of FIG. 5 is illustrated, with the difference that the diffuser disc 420, centered at 422, is sliced into plurality equal-angled slices 428, each having identical diffuser features on to the other. In this case, the diffuser only needs to rotate through an arc corresponding to each slice 428 an integral number of times within the detector integration time (typically once only), thus averaging out the intensity modulation. The complete path 425 experienced by the individual light source 190n in each slice is such as to present a sufficiently varied diffuser pattern such as to provide a sufficiently high number of differently modified light beams which can average out to cancel the speckle effects. The same pattern is repeated in each slice so as to maintain consistency for each light source 190n. This arrangement allows the rotational speed of the disc 420 to be reduced by a factor equal to the number of slices in the disc 420.

Figure 7:
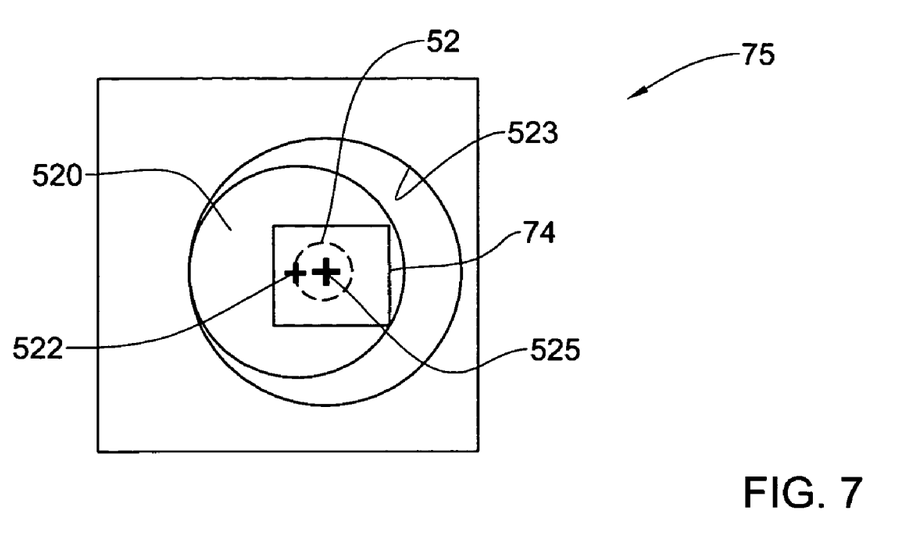
FIG. 7. is front view of an eccentric rotating light diffuser usable with the embodiment of FIG. 3 or FIG. 4.

Referring to FIG. 7, the moving diffuser 75 according to the illustrated arrangement is in the form of a disc 520 eccentrically mounted for rotation within an orbit 523, such that the center of rotation 522 of the disc 520 moves along path 526 about the center 525 of the orbit 523. In this example, the orbit center 525 is coaxial with the optical axis, and the disc 520 is sufficiently large so that each source 190n scans a part of the disc 520 for the full rotation thereof. Accordingly, the size of the moving diffuser is smaller than for the examples illustrated in FIGS. 5 and 6. Other than this, this diffuser operates in a similar manner to that described with references to FIG. 5 or FIG. 6, *mutatis mutandis*.

Figure 8:
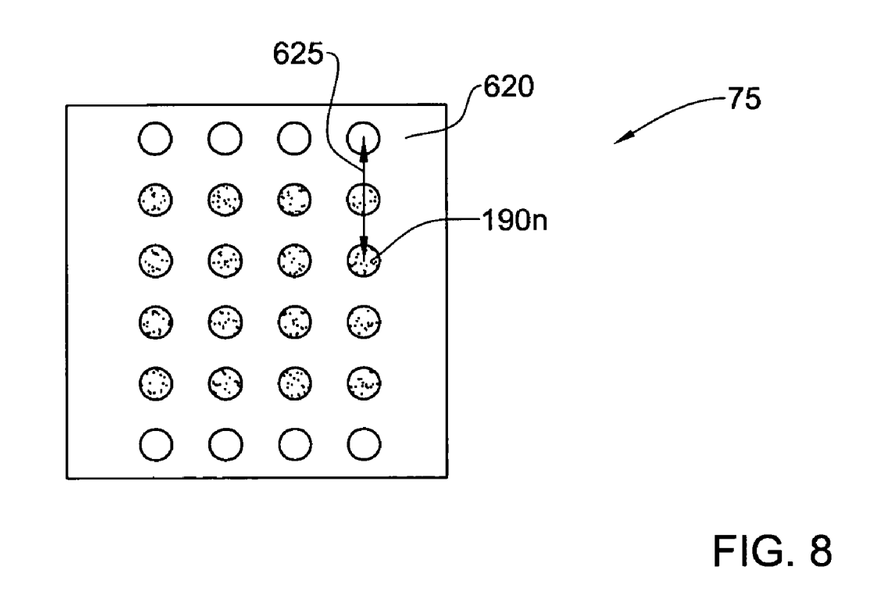
FIG. 8 is front view of a linear displacement light diffuser usable with the embodiment of FIG. 3 or FIG. 4.

Referring to FIG. 8, a more compact diffuser arrangement is illustrated. The diffuser comprises an oscillating diffuser panel 620, whose minimum size corresponds to the amount of movement required, with respect to the spots. The panel 620 is vibrated in a linear manner, and the vibration amplitude, together with the diffuser characteristics, are designed/operated such as to satisfy the requirement of presenting to the light sources 190n a maximum number of independent diffuser pattern in a detector integration time such as to average out speckle effects in this time. Such a movement typically only needs to be or the order of a few times (depending on how many different speckle patterns are to be generated during the integration time of the detector) the size of a single laser spot as focused by the microlens array 74. Such an arrangement can be actuated using any suitable piezoelectric motor, for example, which are well known and do not require further description.

Since the motion of the panel 620 is reciprocal and linear, every given laser spot or source 190n will visit the same site on the diffuser twice per motion period. Hence, the vibration frequency for the panel 620 can be set at half the integration frequency of the detector 82. The complete path 625 experienced by the individual light source 190n is such as to present a sufficiently varied diffuser pattern such as to provide a sufficiently high number of differently modified light beams for each spot 190$n$ which can average out to cancel the speckle effects.

In the method claims that follow, alphanumeric characters and Roman numerals used to designate claim steps are provided for convenience only and do not imply any particular order of performing the steps.

Finally, it should be noted that the word "comprising" as used throughout the appended claims is to be interpreted to mean "including but not limited to".

While there has been shown and disclosed exemplary embodiments in accordance with the invention, it will be appreciated that many changes may be made therein without departing from the spirit of the invention.

The invention claimed is:

1. Optical system for converting a substantially coherent parent light beam into a plurality of light beams having at least reduced spatial coherence of illumination compared to said coherent parent light source, comprising:
   a beam splitter for splitting a parent beam from said coherent parent light source into an array of incident beams, each beam being focused at a spot;
   a moving diffuser arrangement located at or near each said spot, and adapted for presenting a different diffuser part to each focused spot as the diffuser arrangement is moved in a path between at least two positions; and
   a collimator arrangement for collimating the light from said coherent light source.

2. System according to claim 1, wherein said beam splitter comprises a fixed grating or fixed micro-lens array comprising a plurality of micro-lens elements adapted for focusing collimated light from said collimator arrangement to a plurality of said spots.

3. System according to claim 2, wherein said micro-lens elements are plano-convex lens elements, including any one of spherical or aspherical plano-convex lens elements.

4. System according to claim 2, further comprising a relay lens for refocusing said spots to refocused spots, wherein said moving diffuser arrangement is located at or near said refocused spots.

5. System according to claim 4, wherein a length of said path of said diffuser arrangement and at least one diffuser characteristic thereof presented to each said spot are as such to provide a plurality of differently modified wavefronts from each spot, which provide a corresponding plurality of different speckle configurations at an object illuminated via said system.

6. System according to claim 5, wherein said diffuser arrangement comprises any one of:
   a rotating diffuser element having a rotational axis offset with respect to an optical axis of said system, such that the complete path experienced by each said spot during any integral number of complete revolutions of said diffuser arrangement is such as to present a sufficiently varied diffuser pattern so as to provide a corresponding plurality of different speckle configurations at an object illuminated via said system;
   a rotating diffuser element having a rotational axis offset with respect to an optical axis of said system, said diffuser element comprising a plurality of equal-angled segments about the rotational axis each having identical diffuser features one to the other, such that the complete path experienced by each said spot during any integral number of complete segments of said diffuser arrangement is such as to present a sufficiently varied diffuser pattern so as to provide a corresponding plurality of different speckle configurations at an object illuminated via said system;
   a rotating diffuser element adapted for eccentrically rotating within an orbit element, the center of the orbit being aligned with respect to an optical axis of said system, such that the complete path experienced by each said spot during any integral number of complete revolutions of said diffuser arrangement in the orbit is such as to present a sufficiently varied diffuser pattern so as to provide a corresponding plurality of different speckle configurations at an object illuminated via said system;
   an oscillating diffuser element, such that the complete path experienced by each said spot during any integral number of full-amplitude translations of said diffuser arrangement is such as to present a sufficiently varied diffuser pattern so as to provide a corresponding plurality of different speckle configurations at an object illuminated via said system.

7. System according to claim 5, wherein said diffuser arrangement movement has a predetermined speed such that said plurality of different speckle configurations may be obtained within a predetermined time period.

8. System according to claim 7, wherein said time period may be correlated to an integration time period of a detector that may be used in conjunction with said system for detecting light reflected from an object illuminated via said system.

9. A light source for providing a plurality of light beams, comprising:
   a parent coherent light source for providing a parent beam of coherent light;
   a beam splitter for splitting said parent beam into an array of incident beams, each beam being focused at a spot;
   a moving diffuser arrangement located at or near each said spot, and adapted for presenting a different diffuser part to each focused spot as the diffuser arrangement is moved in a path between at least two positions and
   a collimator arrangement for collimating the light from said coherent light source.

10. Source according to claim 9, wherein said beam splitter comprises a fixed grating or fixed micro-lens array comprising a plurality of micro-lens elements adapted for focusing collimated light from said collimator arrangement to a plurality of said spots.

11. Source according to claim 10, wherein said micro-lens elements are piano-convex lens elements, including any one of spherical or aspherical plano-convex lens elements.

12. Source according to claim 10, further comprising a relay lens for refocusing said spots to refocused spots, wherein said moving diffuser arrangement is located at or near said refocused spots.

13. Source according to claim 12, wherein a length of said path of said diffuser arrangement and at least one diffuser characteristic thereof presented to each said spot are as such to provide a plurality of differently modified wavefronts from each spot, which provide a corresponding plurality of different speckle configurations at an object illuminated by said coherent light source.

14. Source according to claim 13, wherein said diffuser arrangement comprises any one of: a rotating diffuser element having a rotational axis offset with respect to an optical axis of said system, such that the complete path experienced by each said spot during any integral number of complete revolutions of said diffuser arrangement is such as to present a sufficiently varied diffuser pattern so as to provide a corresponding plurality of different speckle configurations at an object illuminated by said source; a rotating diffuser element having a rotational axis offset with respect to an optical axis of said system, said diffuser element comprising a plurality of equal-angled segments about the rotational axis each having identical diffuser features one to the other, such that the complete path experienced by each said spot during any integral number of complete segments of said diffuser arrangement is such as to present a sufficiently varied diffuser pattern so as to provide a corresponding plurality of different speckle configurations at an object illuminated by said source; a rotating diffuser element adapted for eccentrically rotating within an orbit element, the center of the orbit being aligned with respect to an optical axis of said system, such that the complete path experienced by each said spot during any integral number of complete revolutions of said diffuser arrangement in the orbit is such as to present a sufficiently varied diffuser pattern so as to provide a corresponding plurality of different speckle configurations at an object illuminated by said source; an oscillating diffuser element, such that the complete path experienced by each said spot during any integral number of full-amplitude translations of said diffuser arrangement is such as to present a sufficiently varied diffuser pattern so as to provide a corresponding plurality of different speckle configurations at an object illuminated by said source.

15. Source according to claim 13, wherein said diffuser arrangement movement has a predetermined speed such that said plurality of different speckle configurations may be obtained within a predetermined time period.

16. Source according to claim 15, wherein said time period may be correlated to an integration time period of a detector that may be used in conjunction with said system for detecting light reflected from an object illuminated by said source.

17. An apparatus adapted for confocal imaging of a non-flat specimen, said apparatus having an optical axis and a predetermined lateral resolution and comprising a light source for producing a light beam, imaging optics adapted to focus the light beam into at least one spot on a surface of a specimen, and a detector having an integration time and adapted to receive and detect light reflected from said surface; said light source comprising:
  a parent coherent light source for providing a parent beam of coherent light;
  a beam splitter for splitting said parent beam into an array of incident beams, each beam being focused at a spot; and
  a moving diffuser arrangement located at or near each said spot, and adapted for presenting a different diffuser part to each focused spot as the diffuser arrangement is moved in a path between at least two positions.

18. Apparatus according to claim 17, further comprising a collimator arrangement for collimating the light from said coherent light source.

19. Apparatus according to claim 18, wherein said beam splitter comprises a fixed grating or fixed micro-lens array comprising a plurality of micro-lens elements adapted for focusing collimated light from said collimator arrangement to a plurality of said spots.

20. Apparatus according to claim 19, wherein said micro-lens elements are plano-convex lens elements, including any one of spherical or aspherical plano-convex lens elements.

21. Apparatus according to claim 19, further comprising a relay lens for refocusing said spots to refocused spots, wherein said moving diffuser arrangement is located at or near said refocused spots.

22. Apparatus according to claim 21, wherein a length of said path of said diffuser arrangement and at least one diffuser characteristic thereof presented to each said spot is as such to provide a plurality of differently modified wavefronts from each spot, which provide a corresponding plurality of different speckle configurations at a specimen illuminated by said light source.

23. Apparatus according to claim 22, wherein said diffuser arrangement movement has a predetermined speed such that said plurality of different speckle configurations may be obtained within a predetermined time period.

24. Apparatus according to claim 23, wherein said time period may be correlated to an integration time period of said detector.

25. Apparatus according to claim 24, wherein a movement of said diffuser arrangement is synchronized to said integration time of said detector such that the averaging of independent said speckle configurations may be performed over one full period of diffuser movement, or a portion of it.

26. Apparatus according to claim 24, wherein said diffuser arrangement comprises any one of: a rotating diffuser element having a rotational axis offset with respect to an optical axis of said system, such that the complete path experienced by each said spot during any integral number of complete revolutions of said diffuser arrangement is such as to present a sufficiently varied diffuser pattern so as to provide a corresponding plurality of different speckle configurations to said detector; a rotating diffuser element having a rotational axis offset with respect to an optical axis of said system, said diffuser element comprising a plurality of equal-angled segments about the rotational axis each having identical diffuser features one to the other, such that the complete path experienced by each said spot during any integral number of complete segments of said diffuser arrangement is such as to present a sufficiently varied diffuser pattern so as to provide a corresponding plurality of different speckle configurations to said detector; a rotating diffuser element adapted for eccentrically rotating within an orbit element, the center of the orbit being aligned with respect to an optical axis of said system, such that the complete path experienced by each said spot during any integral number of complete revolutions of said diffuser arrangement in the orbit is such as to present a sufficiently varied diffuser pattern so as to provide a corresponding plurality of different speckle configurations to said detector; an oscillating diffuser element, such that the complete path experienced by each said spot during any integral number of full-amplitude translations of said diffuser arrangement is such as to present a sufficiently varied diffuser pattern so as to provide a corresponding plurality of different speckle configurations to said detector.

27. The apparatus according to claim 17, wherein the apparatus further comprises a second beam-splitter for directing reflected light from a specimen to said detector.

28. A method for converting a coherent light source into a plurality of light sources having reduced spatial coherence of illumination compared to said coherent light source, comprising:
  splitting a parent beam from a coherent light source into an array of incident beams, each beam being focused at a spot;
  moving a diffuser arrangement that is located at or near each said spot, and presenting a different diffuser part to each focused spot as the diffuser arrangement is moved in a path between at least two positions; and
  collimating the light from said coherent light source.

29. Method according to claim 28, wherein said parent beam is split by means of a fixed grating or fixed micro-lens array comprising a plurality of micro-lens elements adapted for focusing collimated light to a plurality of said spots.

30. Method according to claim 29, further comprising refocusing said spots, and moving said diffuser arrangement between at least two positions at or near said refocused spots.

31. Method according to claim 30, wherein a length of the path of movement of said diffuser arrangement and at least one diffuser characteristic thereof presented to each said spot is such as to provide a plurality of differently modified wavefronts from each spot, which provide a corresponding plurality of different speckle configurations at an object illuminated by said incident beams.

32. Method according to claim 31, wherein said diffuser arrangement comprises any one of: a rotating diffuser element having a rotational axis offset with respect to an optical axis of said system, such that the complete path experienced by each said spot during any integral number of complete revolutions of said diffuser arrangement is such as to present a sufficiently varied diffuser pattern so as to provide a corresponding plurality of different speckle configurations at an object illuminated by said incident beams; a rotating diffuser element having a rotational axis offset with respect to an optical axis of said system, said diffuser element comprising a plurality of equal-angled segments about the rotational axis each having identical diffuser features one to the other, such that the complete path experienced by each said spot during any integral number of complete segments of said diffuser arrangement is such as to present a sufficiently varied diffuser pattern so as to provide a corresponding plurality of different speckle configurations at an object illuminated by said incident beams; a rotating diffuser element adapted for eccentrically rotating within an orbit element, the center of the orbit being aligned with respect to an optical axis of said system, such that the complete path experienced by each said spot during any integral number of complete revolutions of said diffuser arrangement in the orbit is such as to present a sufficiently varied diffuser pattern so as to provide a corresponding plurality of different speckle configurations at an object illuminated by said incident beams; an oscillating diffuser element, such that the complete path experienced by each said spot during any integral number of full-amplitude translations of said diffuser arrangement is such as to present a sufficiently varied diffuser pattern so as to provide a corresponding plurality of different speckle configurations at an object illuminated by said incident beams.

33. Method according to claim 32, wherein said diffuser arrangement is moved at a predetermined speed such that said plurality of different speckle configurations may be obtained within a predetermined time period.

34. Method according to claim 33, wherein said time period may be correlated to an integration time period of a detector that may be used in for detecting light reflected from an object illuminated by said array of incident light beams.

35. A method for confocal imaging of a non-flat specimen, the method comprising: providing an apparatus comprising a coherent source of light and a detector; splitting a parent beam from a coherent light source into an array of incident beams, each beam being focused at a spot; moving a diffuser arrangement at the origin of said array of incident beams, and presenting a different diffuser part to each said incident beam as the diffuser arrangement is moved between at least two positions; focusing the incident beams into at least one spot on a surface of the specimen by means of imaging optics; directing light reflected by the surface toward the detector; detecting the light by the detector; wherein said diffuser arrangement is moved between said positions within the integration time of the detector.

36. Method according to claim 35, further comprising the step of collimating the light from said coherent light source.

37. Method according to claim 35, wherein said parent beam is split by means of a fixed grating or fixed micro-lens array comprising a plurality of micro-lens elements adapted for focusing collimated light to a plurality of said spots.

38. Method according to claim 37, further comprising refocusing each said spot, and moving said diffuser arrangement between at least two positions at or near said refocused spots.

39. Method according to claim 38, wherein a length of the path of movement of said diffuser arrangement and at least one diffuser characteristic thereof presented to each said spot is such as to provide a plurality of differently modified wavefronts from each spot, which provide a corresponding plurality of different speckle configurations at a specimen illuminated by said incident beams.

40. Method according to claim 38, wherein a movement of said diffuser arrangement is synchronized to said integration time of said detector such that the averaging of independent said speckle configurations may be performed over one full period of diffuser movement, or a portion of it.

41. Method according to claim 40, wherein said diffuser arrangement comprises any one of: a rotating diffuser element having a rotational axis offset with respect to an optical axis of said system, such that the complete path experienced by each said spot during any integral number of complete revolutions of said diffuser arrangement is such as to present a sufficiently varied diffuser pattern so as to provide a corresponding plurality of different speckle configurations at an object illuminated by said incident beams; a rotating diffuser element having a rotational axis offset with respect to an optical axis of said system, said diffuser element comprising a plurality of equal-angled segments about the rotational axis each having identical diffuser features one to the other, such that the complete path experienced by each said spot during any integral number of complete segments of said diffuser arrangement is such as to present a sufficiently varied diffuser pattern so as to provide a corresponding plurality of different speckle configurations at an object illuminated by said incident beams; a rotating diffuser element adapted for eccentrically rotating within an orbit element, the center of the orbit being aligned with respect to an optical axis of said system, such that the complete path experienced by each said spot during any integral number of complete revolutions of said diffuser arrangement in the orbit is such as to present a sufficiently varied diffuser pattern so as to provide a corresponding plurality of different speckle configurations at an object illuminated by said incident beams; an oscillating diffuser element, such that the complete path experienced by each said spot during any integral number of full-amplitude translations of said diffuser arrangement is such as to present a sufficiently varied diffuser pattern so as to provide a corresponding plurality of different speckle configurations at an object illuminated by said incident beams.

* * * * *